United States Patent
Seok et al.

(10) Patent No.: US 7,114,072 B2
(45) Date of Patent: Sep. 26, 2006

(54) APPARATUS AND METHOD FOR WATERMARK EMBEDDING AND DETECTION USING LINEAR PREDICTION ANALYSIS

(75) Inventors: Jong-Won Seok, Taejon (KR); Jin-Woo Hong, Taejon (KR); Jin-Heung Lee, Pusan (KR)

(73) Assignee: Electronics and Telecommunications Research Institute, Taejon (KR)

( * ) Notice: Subject to any disclaimer, the term of this patent is extended or adjusted under 35 U.S.C. 154(b) by 712 days.

(21) Appl. No.: 09/833,702

(22) Filed: Apr. 13, 2001

(65) Prior Publication Data

US 2002/0087863 A1 Jul. 4, 2002

(30) Foreign Application Priority Data

Dec. 30, 2000 (KR) .............................. 2000-86648

(51) Int. Cl.
*H04L 9/00* (2006.01)
(52) U.S. Cl. ..................................................... 713/176
(58) Field of Classification Search ................ 713/176; 382/100
See application file for complete search history.

(56) References Cited

U.S. PATENT DOCUMENTS

| | | | |
|---|---|---|---|
| 5,319,735 A * | 6/1994 | Preuss et al. ................ 704/205 |
| 5,379,345 A | 1/1995 | Greenberg |
| 5,473,631 A | 12/1995 | Moses |
| 5,613,004 A | 3/1997 | Cooperman et al. |
| 5,687,191 A | 11/1997 | Lee et al. |
| 5,774,452 A | 6/1998 | Wolosewicz |
| 5,787,391 A * | 7/1998 | Moriya et al. .............. 704/225 |
| 5,889,868 A * | 3/1999 | Moskowitz et al. ......... 713/176 |
| 5,915,027 A | 6/1999 | Cox et al. |
| 6,014,620 A * | 1/2000 | Handel ........................ 704/219 |
| 6,246,760 B1 * | 6/2001 | Makino et al. ......... 379/406.08 |
| 6,430,301 B1 * | 8/2002 | Petrovic ...................... 382/100 |
| 6,535,616 B1 * | 3/2003 | Hayashi et al. .............. 382/100 |
| 6,687,667 B1 * | 2/2004 | Gournay et al. ............ 704/222 |
| 6,724,911 B1 * | 4/2004 | Cox et al. .................... 382/100 |
| 6,738,493 B1 * | 5/2004 | Cox et al. .................... 382/100 |
| 6,853,726 B1 * | 2/2005 | Moskowitz et al. ........... 380/28 |
| 6,892,175 B1 * | 5/2005 | Cheng et al. ................ 704/205 |

* cited by examiner

*Primary Examiner*—Ayaz Sheikh
*Assistant Examiner*—Pramila Parthasarathy
(74) *Attorney, Agent, or Firm*—Mayer, Brown, Rowe & Maw LLP (57) ABSTRACT

In the apparatus and method for a watermark embedding and detection through a linear prediction analysis, and a record medium capable of being read through a computer having a writing of a program to realize the inventive method, in which a quality of a signal does not drop, even after an imbedding of a watermark by using a signal based on a changed shape of an original signal through a use of a linear prediction analysis, with a watermark signal to be imbedded in a digital signal, but also the watermark signal containing copyright information can be detected even though an optional attack is applied thereto.

7 Claims, 5 Drawing Sheets

FIG. 5

APPARATUS AND METHOD FOR WATERMARK EMBEDDING AND DETECTION USING LINEAR PREDICTION ANALYSIS

FIELD OF THE INVENTION

The present invention relates to an apparatus and method for a watermark embedding and detection using a linear prediction analysis, and a record medium capable of being read through a computer to realize the inventive method; and, more particularly, to an apparatus and method for a watermark embedding and detection using a linear prediction analysis, and a record medium capable of being read through a computer having a writing of a program to realize the inventive method, in which a watermark used for a copyright information protection and management of a digital signal can be efficiently embedded, a quality of the digital signal does not drop even after the imbedding of a watermark signal by using a perception model based on a hearing characteristic of a human being, and further the watermark signal containing the copyright information can be stably detected even though various attacks using an optional method are applied to the digital signal having the imbedding of the watermark.

PRIOR ART OF THE INVENTION

Recently, a rapid development in a computer use and a computer network such as Internet generally brings about the use and spread of multimedia data. In such multimedia data, but, another original is made owing to attributes of digital in case that multimedia data is copied, thus anyone can obtain such digital data through an easy illegal reproduction. With such reasons it is caused a requirement for protecting the copyright and the ownership of an author who produces multimedia contents and for preventing the illegal reproduction.

A data protection technique most representative and widely used up to the present is the method of encoding data, and has merits that an approach to the data is impossible if a user does not know its codes. In this technique, meantime, after the codes are first decoded, there is a problem that the data may be illegally copied and distributed without any limitation. Meanwhile, a digital watermark is a kind of digital signature appended to an original signal so as to enable to be detected or extracted after an embedding into the digital data, and is based on the method for protecting the copyright and the ownership information of the digital data even after decoding.

However, in methods for protecting the copyrights of the digital data through a use of watermarks announced by this time, there are many cases that an audio quality falls after the embedding of the watermark. Further, in case that a signal process optional attack such as a compression or filtering is applied to an audio signal having an imbedding of the watermark, there is a problem that the watermark can not be extracted. Particularly, the existing announced watermark embedding and detecting methods are mostly based on a diffusion spectrum system used in a code division multiple access (CDMA) communication. In the existing watermarking method using such diffusion spectrum system, in case that an attack on a time base such as a linear speed change, a pitch-invariant time-scale modification, and a wow and flutter etc. is applied, it is caused a problem the a detection of the watermark is impossible. This problem is caused because in the system based on the existing diffusion spectrum system, a pseudo-noise sequence is used as a watermark signal and a synchronization between the pseudo-noise sequence and an audio signal having an imbedding of the watermark is not matched in a watermark detecting part in case that the attack on the time base is applied thereto.

SUMMARY OF THE INVENTION

Therefore, it is an object of the present invention to provide an apparatus and method for a watermark embedding and detection using a linear prediction analysis, and a record medium capable of being read through a computer having a writing of a program to realize the inventive method, in which not only a quality of a signal does not fall, even after an imbedding of a watermark by using a signal based on a changed shape of an original signal through a use of a linear prediction analysis, through a use of a watermark signal to be imbedded in a digital signal, but also a watermark signal containing copyright information can be detected even though an optional attack is applied thereto.

In accordance with the present invention for achieving the objects, the watermark imbedding apparatus using a linear prediction analysis includes a linear prediction analyzing unit for receiving an original signal and detecting a prediction coefficient predetermined through the linear prediction analysis; a delay unit for receiving the original signal and delaying it by a predetermined time; a linear prediction analysis filtering unit for filtering the signal delayed in the delay unit by using the prediction coefficient detected in the linear prediction analyzing unit; a frequency area converting unit for converting the signal outputted from the linear prediction analysis filtering unit into a frequency area signal; a psychological acoustic modeling unit for receiving the original signal and gaining a masking threshold by employing a psychological acoustic model; a time-varying adaptation filtering unit for performing a control so that the signal outputted from the frequency area converting unit may have a magnitude approximate to a magnitude of the masking threshold gained in the psychological acoustic modeling unit; a time area converting unit for changing the signal outputted from the time-varying adaptation filtering unit to a time area signal; an error correction coding unit for receiving copyright information and providing an error correction function; a code generating unit for providing a code to the time area signal outputted from the time area converting unit in response to the signal outputted from the error correction coding unit; and a computing unit for adding and deducting the signal having the code provided from the code generating unit to/from the original signal in response to a corresponding code.

In another apparatus of the present invention, the watermark detecting apparatus using the linear prediction analysis is composed of a linear prediction analyzing unit for receiving a signal having an imbedding of a watermark and outputting a prediction coefficient predetermined through the linear prediction analysis; a linear prediction analysis filtering unit for filtering the signal having the imbedding of the watermark by using the prediction coefficient extracted from the linear prediction analyzing unit; an autocorrelation acquiring unit for receiving a filtered value outputted from the linear prediction analysis filtering unit and gaining an autocorrelation; a code detecting unit for detecting a code of a correlation outputted from the autocorrelation acquiring unit; and an error correction decoding unit for performing an error correction decoding according to a code detection result value outputted from the code detecting unit and extracting a watermark signal.

In one method of the present invention, the watermark imbedding method applied to the watermark imbedding apparatus using the linear prediction analysis includes a first step of receiving an original signal, and detecting a prediction coefficient predetermined through the linear prediction analysis, and delaying it by a predetermined time, and gaining a masking threshold by employing a psychological acoustic model; a second step of filtering the delayed audio signal by using the detected prediction coefficient; a third step of converting a value filtered in the second step into a frequency area signal; a fourth step of AR(Auto-regressive)-filtering the frequency area signal by using the masking threshold; a fifth step of converting the signal filtered in the fourth step into a time area signal; a sixth step of generating an error correction code having copyright information and an error correction function and providing a code to the time area signal according to the error correction code; and a seventh step of adding and deducting the time area signal to/from the original signal according to the provided code, and producing a signal having an imbedding of a watermark.

In another method of the present invention, the watermark detecting method applied to the watermark detecting apparatus using the linear prediction analysis includes a first step of receiving a signal having an imbedding of a watermark, and detecting a prediction coefficient predetermined through the linear prediction analysis; a second step of filtering the signal having the imbedding of watermark by using the detected prediction coefficient; a third step of measuring an autocorrelation of the filtered signal; a fourth step of detecting a code for the measured correlation; and a fifth step of performing an error correction decoding by using the code detection result, and extracting a watermark signal.

While, in a watermark imbedding apparatus having a processor based on a large capacitance, in the record medium capable of being read through a computer having a writing of a program, the program contains a first function of receiving an original signal, and detecting a prediction coefficient predetermined through a linear prediction analysis, and delaying it by a predetermined time, and gaining a masking threshold by employing a psychological acoustic model; a second function of filtering the delayed audio signal by using the detected prediction coefficient; a third function of converting a value filtered in the second function into a frequency area signal; a fourth function of AR(Auto-regressive)-filtering the frequency area signal by using the masking threshold; a fifth function of converting the signal filtered in the fourth function into a time area signal; a sixth function of generating an error correction code having copyright information and an error correction function and providing a code to the time area signal according to the error correction code; and a seventh function of adding and deducting the time area signal to/from the original signal according to the provided code, and producing a signal having an imbedding of a watermark.

In addition, in a watermark detecting apparatus having a processor based on a large capacitance and in the record medium capable of being read through a computer having a writing of a program, the program contains a first function of receiving a signal having an imbedding of a watermark, and detecting a prediction coefficient predetermined through a linear prediction analysis; a second function of filtering the signal having the imbedding of watermark by using the detected prediction coefficient; a third function of measuring an autocorrelation of the filtered signal; a fourth function of detecting a code for the measured correlation; and a fifth function of performing an error correction decoding by using the code detection result, and extracting a watermark signal.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
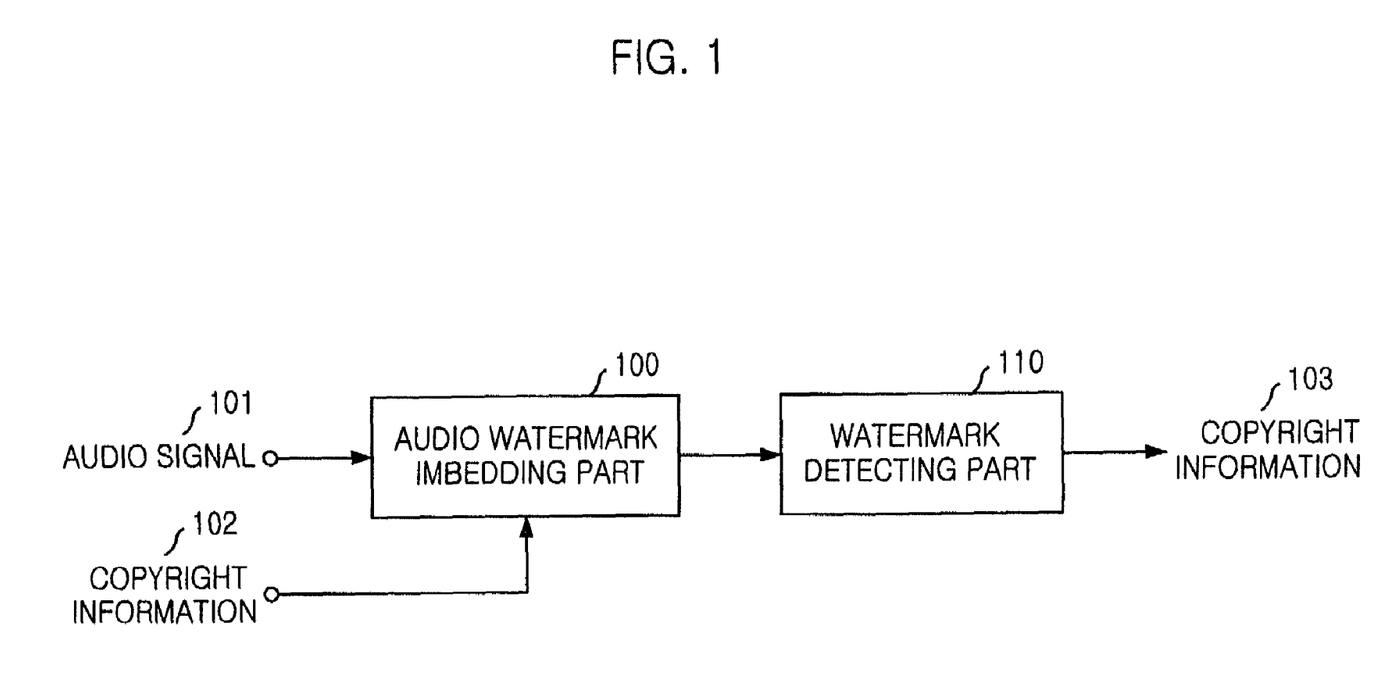
FIG. 1 is a block diagram of one embodiment for a watermark imbedding/detecting apparatus in accordance with the present invention.

FIG. 1 is a block diagram of one embodiment for a watermark imbedding/detecting apparatus in accordance with the present invention.

As shown in FIG. 1, the inventive watermark imbedding/detecting apparatus includes an audio watermark imbedding part 100 for receiving an audio signal 101 and copyright information 102 of the audio signal and imbedding a watermark signal in the audio signal 101; and a watermark detecting part 200 for receiving the audio signal having the imbedding of the watermark signal in the audio watermark imbedding part 100 and detecting the watermark signal as the copyright information.

In the audio signal 101 inputted to the audio watermark imbedding part 100, audio copyright information data 102 is imbedded repeatedly with a constant time interval. A quantity of such imbedded data can be optionally controlled. In other words, the quantity of the imbedded information can be controlled by performing a control for a size of an audio signal section into which the copyright information 102 will be imbedded. Also, information to be imbedded in the audio signal 101 is valid for all the copyright information based on optional shapes such as image, video, audio, sound and text etc.

Figure 2:
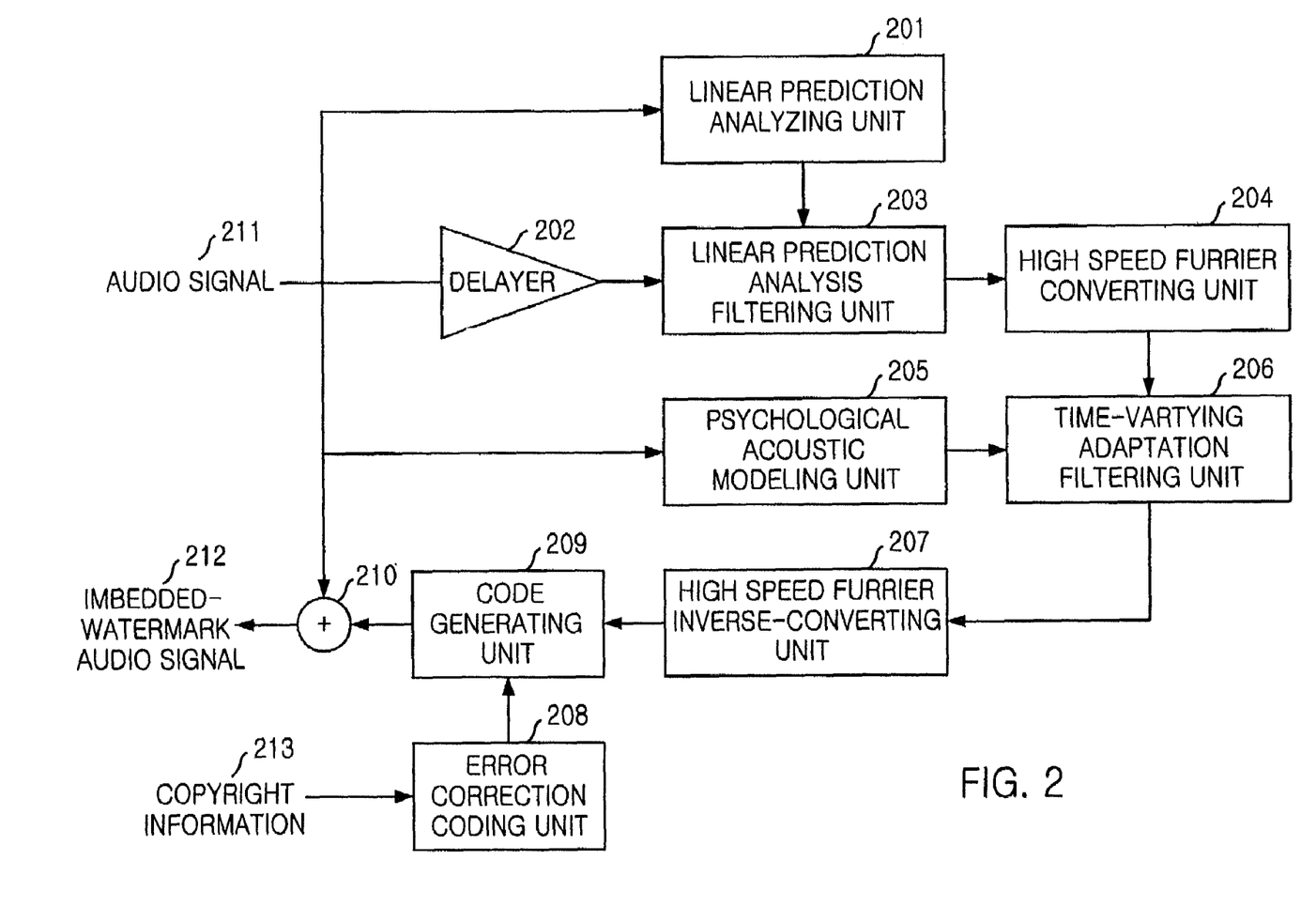
FIG. 2 illustrates a detailed block diagram of one embodiment for the audio watermark imbedding part in the present invention.

FIG. 2 is a detailed block diagram of one embodiment for the audio watermark imbedding part in the present invention.

As shown in FIG. 2, the audio watermark imbedding part includes a linear prediction analyzing unit 201 for receiving an audio signal 211 and detecting a prediction coefficient predetermined through the linear prediction analysis; a delayer 202 for receiving the audio signal 211 and delaying it by a predetermined time, and sending the delayed signal to a linear prediction analysis filtering unit 203; the linear prediction analysis filtering unit 203 for filtering the audio signal delayed in the delayer 202 by using the prediction coefficient detected in the linear prediction analyzing unit 201; a high speed furrier converting unit 204 for converting the signal outputted from the linear prediction analysis filtering unit 203 into a frequency area signal; a psychological acoustic modeling unit 205 for receiving the audio signal 211 and gaining a masking threshold by employing a psychological acoustic model; a time-varying adaptation filtering unit 206 for performing a control so that the signal outputted from the high speed furrier converting unit 204 may have a magnitude approximate to a magnitude of the masking threshold gained in the psychological acoustic modeling unit 205; a high speed furrier inverse-converting unit 207 for changing the signal outputted from the time-varying adaptation filtering unit 206 to a time area signal; an error correction coding unit 208 for providing an error correction function to copyright information 213; a code generating unit 209 for providing a code to the time area signal outputted from the high speed furrier inverse-converting unit 207 according to the signal outputted from the error correction coding unit 208; and an adder 210 for adding and deducting the signal having the code provided from the code generating unit 209 to/from the input audio signal 211 in response to a corresponding code.

Operations of the watermark imbedding part are described more in detail, as follows.

First, in the linear prediction analyzing unit 201 receiving the audio signal 211, prediction coefficients of the P number, $a_1, a_2, a_3, \ldots, a_p$, predetermined through the linear prediction analysis are detected. The prediction coefficient P may become different according to a state of the inputted audio and is decided between 5 and 50.

That is, the linear prediction analyzing unit 201 analyzes the audio signal 211 inputted to a portion performing the linear prediction analysis, and generates the prediction coefficients $a_1, a_2, a_3, \ldots, a_p$ capable of predicting the inputted audio signal 211. At this time, a specific spectrum of the inputted audio signal can be predicted by using the generated prediction coefficient.

The delayer 202 receives an original audio signal and delays it by a predetermined time τ, and after that, sends the delayed signal to the linear prediction analysis filtering unit 203. Herewith, the delay τ becomes a key value in a watermark detection.

The linear prediction analysis filtering unit 203 performs a filtering for the audio signal delayed by τ in the delayer 202 by using the prediction coefficients of the P number generated in the linear prediction analyzing unit 201. In other words, the linear prediction analysis filtering unit 203 filters the inputted audio signal 211 by using the prediction coefficient capable of predicting the audio spectrum, and outputs a residual signal gotten by removing the audio specific spectrum therefrom, or a filtered value provided as an error signal.

The residual signal as an output of the linear prediction analysis filtering unit 203 is converted into a frequency area signal through the high-speed furrier converting unit 204.

Meantime, the psychological acoustic model unit 205 receives the original audio signal 211 and gains a masking threshold by employing a psychological acoustic model. This masking threshold indicates a threshold capable of sensing original sound in the frequency area. Thus, even though signal components under the masking threshold is added to the original sound of the audio, the added sound can not be sensed. Such masking threshold can be obtained by using the psychological acoustic model used in an MPEG (Moving Picture Expert Group) audio coding system.

The time-varying adaptation filtering unit 206 filters a signal passed through the high-speed furrier converting unit 204 by utilizing the masking threshold inputted from the psychological acoustic model unit 205. That is, in the time-varying adaptation filtering unit 206, a characteristic of a filter is changed differently by a characteristic of audio changed according to a time, and the time-varying adaptation filtering unit 206 performs a control so that the signal outputted from the high speed furrier converting unit 204 may have a magnitude approximate to a magnitude of the masking threshold gotten from the psychological acoustic model unit 205.

Herewith, in processing the audio signals 211, the audio signals 211 are sequentially processed by a unit of a frame having a constant magnitude, and at this time, respective different masking thresholds every respective frame are gained. That is, since the masking threshold changed every frame becomes different, it is controlled every frame so that the signal outputted from the high speed furrier converting unit 204 may have a magnitude approximate to a magnitude of the masking threshold obtained in the psychological acoustic model unit 205. In the time-varying adaptation filtering unit 206, an AR(Auto-regressive) filter is made on the basis of the obtained masking threshold, after that, the signal outputted from the high speed furrier converting unit 204 is passed through the AR filter so as to have the magnitude approximate to the masking threshold.

An output signal from the time-varying adaptation filtering unit 206 is changed to a signal of a time area through the high speed furrier inverse-converting unit 207.

Meanwhile, the copyright information 213 is inputted to the code generating unit 209 through the error correction code unit 208. The error correction code unit 208 provides an error correction function capable of correcting an error causable in detecting the watermark signal. The code generating unit 209 performs a function for giving a code to the signal passed through the high speed furrier inverse-converting unit 207 and changed to the time area signal, and the code generating unit 209 gives a minus code in case an output signal of the error correction code unit 208 is 0, and gives a plus code in a case of 1. That is, in case that the minus code is given by the code generating unit 209, the signal passed through the high speed furrier inverse-converting unit 207 is omitted from the original audio signal, and in case that the plus code is given from the code generating unit 209, the signal passed through the high speed furrier inverse-converting unit 207 is added to the original audio signal, to thereby finally produce an audio signal 212 in which the watermark signal containing copyright information 213 is imbedded.

That is to say, the watermark signal to be finally imbedded in the original audio is the signal gained by delaying by τ the original audio signal from which the audio spectrum is eliminated through the linear prediction analysis.

Figure 3:
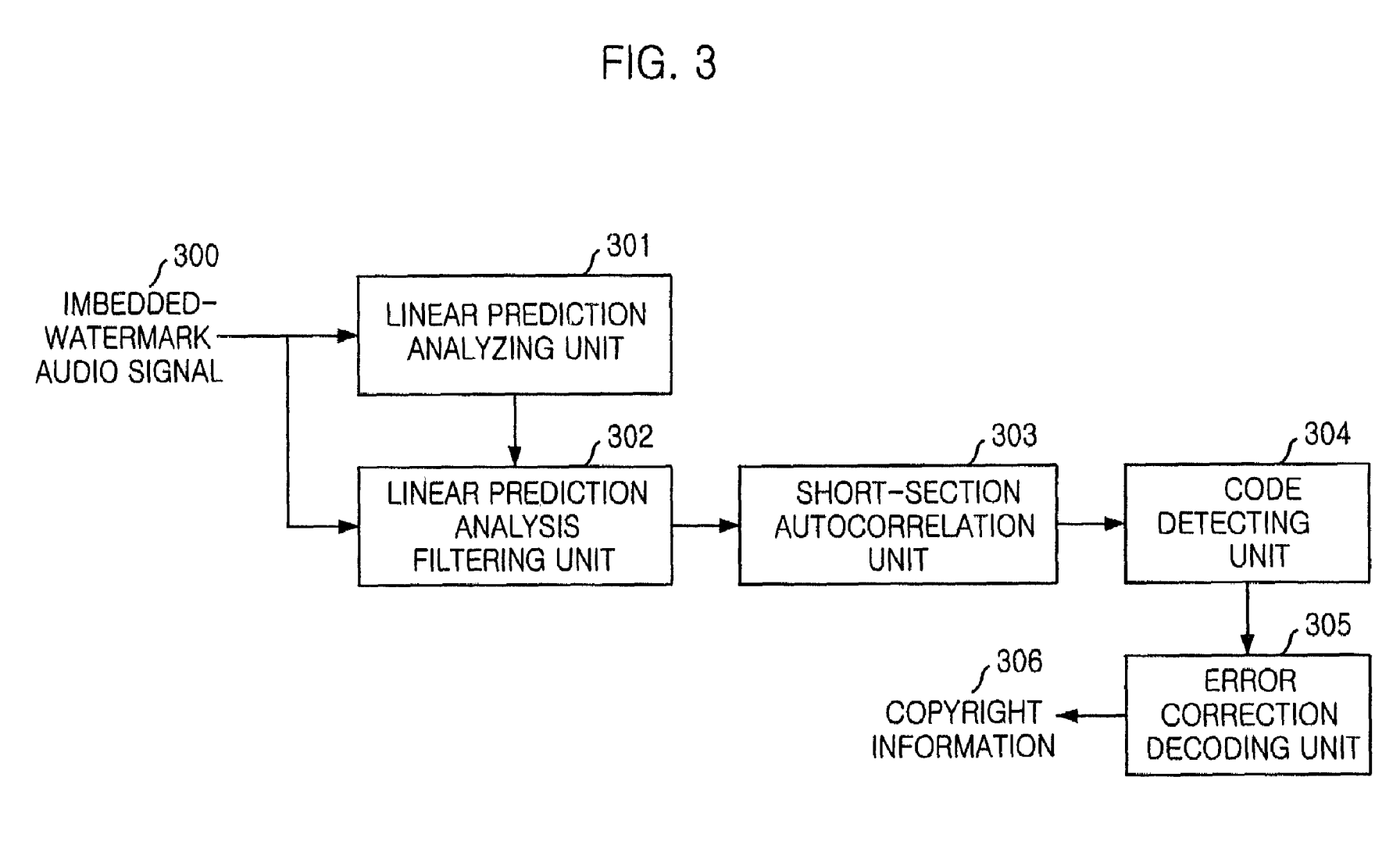
FIG. 3 depicts a detailed block diagram of one embodiment for the inventive watermark detecting part.

FIG. 3 is a detailed block diagram of one embodiment for the inventive watermark detecting part.

As shown in FIG. 3, the inventive watermark detecting part a linear prediction analyzing unit 301 for receiving an audio signal 300 having an imbedding of the watermark and detecting a prediction coefficient predetermined through the linear prediction analysis; a linear prediction analysis filtering unit 302 for filtering the audio signal 300 having the imbedding of the watermark by using the prediction coefficient extracted from the linear prediction analyzing unit 301; a short-section autocorrelation unit 303 for receiving a filtered value outputted from the linear prediction analysis filtering unit 302 and computing an autocorrelation; a code detecting unit 304 for detecting a code of a correlation outputted from the short-section autocorrelation unit 303; and an error correction decoding unit 305 for receiving the code detection result value outputted from the code detecting unit 304, performing an error correction decoding, and extracting a watermark signal.

Operation procedures in the watermark detecting part are described more in detail, as follows.

The linear prediction analyzing unit 301 receives the audio signal 300 having the imbedding of the watermark, as its input, and performs a linear prediction analysis for the audio signal 300 having the imbedding of the watermark, and then, generates prediction coefficients $a_1, a_2, a_3, \ldots, a_p$ capable of predicting the inputted audio signal 300 having the imbedding of the watermark, and sends them to the linear prediction analysis filtering unit 302.

The linear prediction analysis filtering unit 302 performs the same operation as the linear prediction analysis filtering unit 203 of the watermark imbedding part 100, to thus output a residual signal gotten by eliminating spectrum of audio having an imbedding of the watermark or a filtered value provided as an error signal.

This outputted residual signal is gained by a combination of a residual signal of the original audio signal and a residual signal of the original audio signal delayed by τ. The output signal having such characteristic is inputted to a short-section autocorrelation unit 303.

The short-section autocorrelation unit 303 computes autocorrelations of the inputted signal. As above-mentioned, since the signal inputted to 303 is the signal gotten by the combination of the residual signal of the original audio signal and the residual signal of the original audio signal delayed by τ, when the autocorrelation is measured for this signal, the highest correlation is provided at a starting point and a position of τ.

The code detecting unit 304 checks a code for a correlation at the τ position measured in the short-section autocorrelation unit 303, and in case the code is plus, '1' is outputted, and in case the code is minus, '0' is outputted. Such result is sent to an error correlation decoding unit 305.

The error correlation decoding unit 305 receives bit information of the inputted '1' or '0', and performs an error correlation decoding for it, and restores it in case that the error occurs.

An output of the error correlation decoding unit 305 becomes final copyright information 306.

Figure 4:
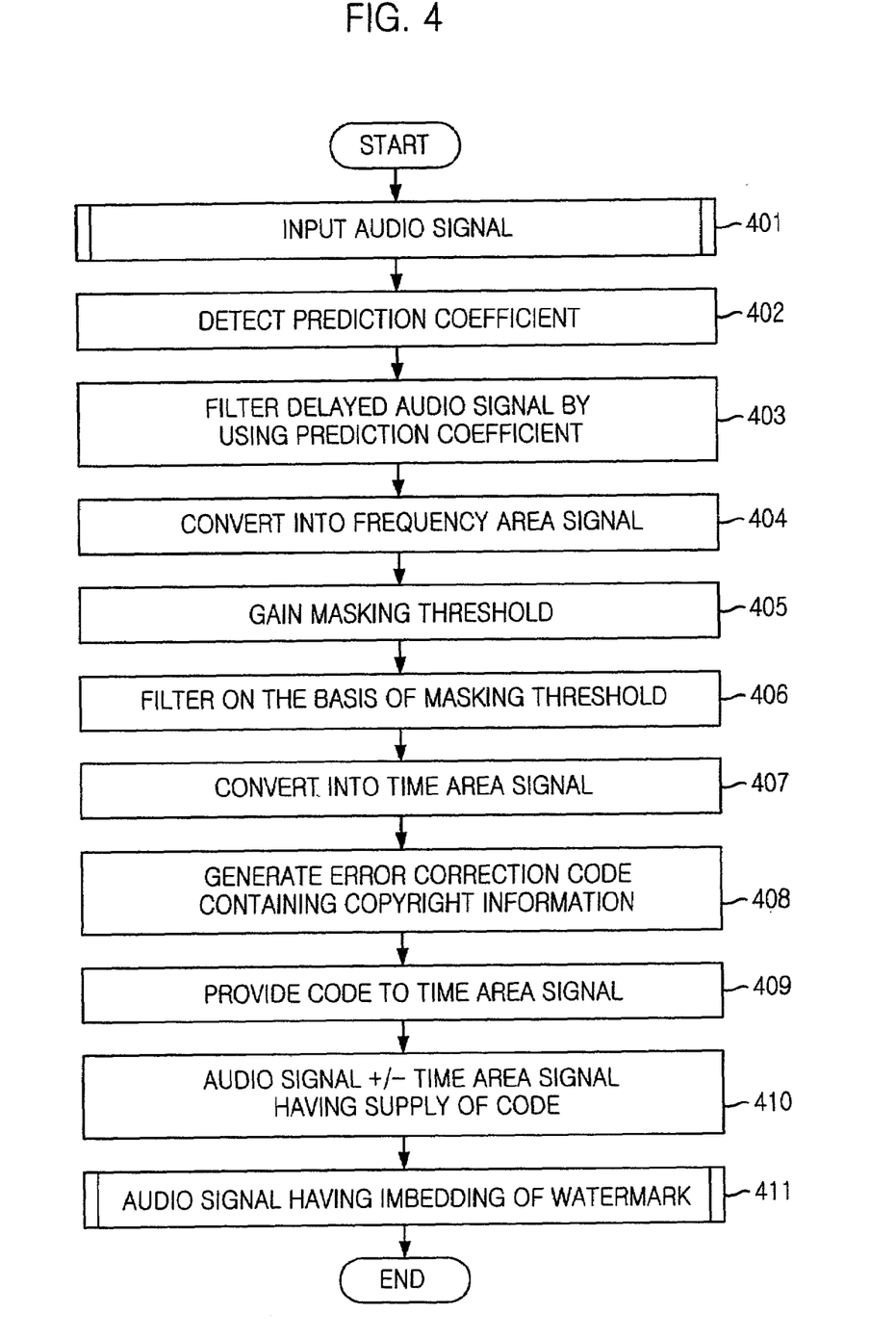
FIG. 4 is a flowchart of one embodiment for the inventive watermark imbedding method.

FIG. 4 is a flowchart of one embodiment for the inventive watermark imbedding method.

As shown in FIG. 4, first, in a step 401, an audio signal is received and a prediction coefficient predetermined through the linear prediction analysis is detected in a step 402. The audio signal is received and is delayed by a predetermined time, and the delayed audio signal is filtered by using the detected prediction coefficient, to thus gain a residual signal gotten by eliminating the audio peculiar spectrum or the filtered value provided as the error signal in a step 403, and then the filtered value is converted into a frequency area signal in a step 404.

Next, the masking threshold is obtained by applying the psychological acoustic model to the audio signal in a step 405, and the frequency area signal is AR(Auto-regressive)-filtered by using the masking threshold in a step 406. The filtered signal is converted into a time area signal in a step 407.

Subsequently, the error correction code having the copyright information and the error correction function is generated in a step 408, and the code is given to the time area signal according to the error correction code in a step 409. Herewith, in case that a signal of the error correction code is '0', a minus code is given, and in a case of '1', a plus code is given.

An audio signal having an imbedding of the watermark is produced by adding up or deducting the original audio signal and the time area signal having the code, in a step 411.

Figure 5:
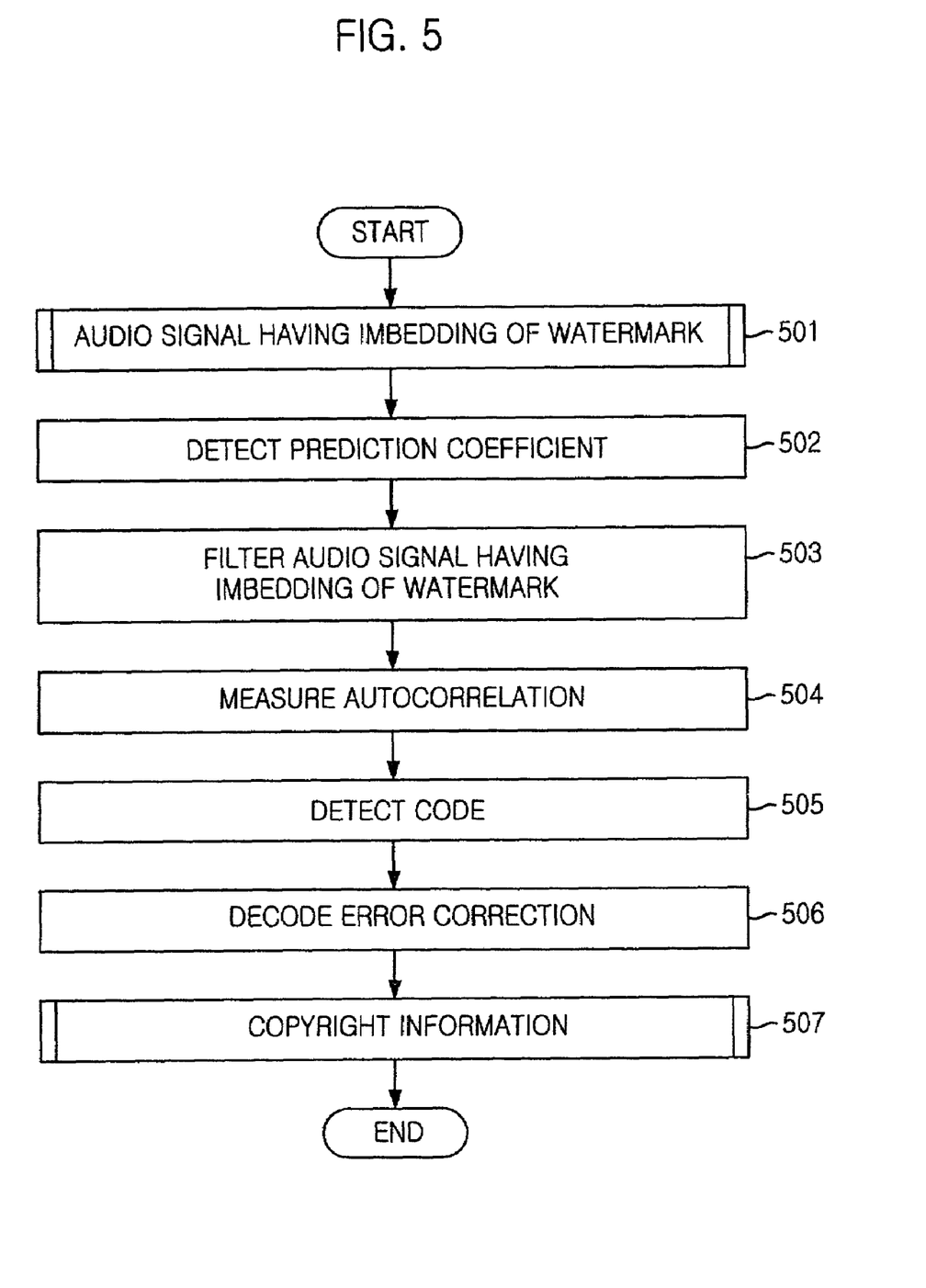
FIG. 5 is a flowchart of one embodiment for the inventive watermark detecting method.

FIG. 5 is a flowchart of one embodiment for the inventive watermark detecting method.

As shown in FIG. 5, the audio signal having the imbedding of the watermark is inputted in a step 501. Then, the prediction coefficient predetermined through the linear prediction analysis is extracted in a step 502, and it is gained the residual signal gotten by eliminating the spectrum of the audio having the imbedding of the watermark or the filtered value provided as the error signal by using the prediction coefficient, in a step 503. Herewith, the outputted residual signal is gotten by combining the residual signal of the original audio signal and the residual signal of the original audio signal delayed by τ.

Next, it is measured the autocorrelation of the signal gotten by combining the residual signal of the filtered original audio signal and the-residual signal of the original audio signal delayed by τ, and a code for the correlation at the measured τ position is detected. If the code is plus, '1' is outputted, and if the code is minus, '0' is outputted, in a step 505. The error correction decoding is performed by using the code detection result in a step 506, and the copyright information is extracted in a step 507.

Such described inventive method is embodied by a program, and can be stored as a type capable of being read through a computer at a record medium such as CDROM, RAM, ROM, floppy disk, hard disk and optical-magnetic disk etc.

As afore-mentioned, in accordance with the present invention, the inventive technique can be used as the kernel of technique for the copyright protection of a digital signal, a watermark can be imbedded without deteriorating a quality of the digital signal, and a watermark signal can be stably extracted even though a voluntary attack such as a compression, a time base attack and a filtering etc. is delivered.

In addition, the inventive technique can be utilized in an authentication for clarifying an existence or inexistence for a manipulation or a change of the digital signal, and can be also used in a usage control capable of controlling, by a use of watermark, the number of reproductions permissible when digital data is played through a portable device or other equipment. Additionally, there is an effect of performing a transmission by using, as the watermark, additional data instead of copyright information.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. An apparatus for imbedding a watermark by using a linear prediction analysis, comprising:

a linear prediction analyzing unit for receiving an original signal and detecting a prediction coefficient predetermined through the linear prediction analysis;

a delay unit for receiving the original signal and delaying it by a predetermined time;

a linear prediction analysis filtering unit for filtering the signal delayed in the delay unit by using the prediction coefficient detected in the linear prediction analyzing unit;

a frequency area converting unit for converting the signal outputted from the linear prediction analysis filtering unit into a frequency area signal;

a psychological acoustic modeling unit for receiving the original signal and gaining a masking threshold by employing a psychological acoustic model;

a time-varying adaptation filtering unit for performing a control so that the signal outputted from the frequency area converting unit may have a magnitude approximate a magnitude the masking threshold gained in the psychological acoustic modeling unit;

a time area converting unit for changing the signal outputted from the time-varying adaptation filtering unit to a time area signal;

an error correction coding unit for receiving copyright information and providing an error correction function;

a code generating unit for providing a code to the time area signal outputted from the time area converting unit response to a signal outputted from the error correction coding unit; and computing unit for adding and deducting the signal having the code provided from the code generating unit to/from the original signal response to a corresponding code, and producing a signal having an imbedding of the watermarks;

wherein said psychological acoustic modeling unit receives the original audio signal and obtains the masking threshold as a threshold capable of sensing audio original sound in a frequency area by employing a psychological acoustic model.

2. The apparatus as recited in claim 1, wherein said linear prediction analyzing unit extracts the prediction coefficient capable of predicting audio peculiar spectrum through the linear prediction analysis.

3. The apparatus as recited in claim 1, wherein said delay unit receives the original signal and delays it by a predetermined constant time, and after that, sends the delayed signal to the linear prediction analysis filtering unit, said delayed constant time τ becoming a key value in a watermark detection.

4. The apparatus as recited in claim 3, wherein said time-varying adaptation filtering unit makes an AR (autoregressive) filter on the basis of the masking threshold obtained in the psychological acoustic modeling unit, and then, performs a control so that the signal outputted from the frequency area converting unit may be passed through the AR filter and may thereby have a magnitude approximate to the masking threshold.

5. A method of imbedding a watermark in a watermark imbedding apparatus using a linear prediction analysis, said method comprising the steps of:

a) receiving an original signal, detecting a prediction coefficient predetermined through the linear prediction analysis, delaying it by a predetermined time, and gaining a masking threshold by employing a psychological acoustic model;

b) filtering the delayed audio signal by using the detected prediction coefficient;

c) converting a value filtered in said second step into a frequency area signal;

d) AR(Auto-regressive)-filtering the frequency area signal by using the masking threshold;

e) converting the signal filtered in said fourth step into a time area signal;

f) generating an error correction code having copyright information and an error correction function, and providing a code to the time area signal according to the error correction code; and g) adding and deducting the time area signal to/from the original signal according to the provided code, and producing a signal having an imbedding of the watermark.

6. The method as recited in claim 5, wherein in the prediction coefficient detecting step, said prediction coefficient capable of predicting audio peculiar spectrum is detected through the linear prediction analysis.

7. A record medium capable of being read through a computer having a writing of a program, in a watermark imbedding apparatus having a processor based on a large capacitance, said program comprising:

a first function of receiving an original signal, detecting a prediction coefficient predetermined through a linear prediction analysis, delaying it by a predetermined time, and gaining a masking threshold by employing a psychological acoustic model;

a second function of filtering the delayed audio signal by using the detected prediction coefficient;

a third function of converting a value filtered in said second function into a frequency area signal;

a fourth function of AR(Auto-regressive)-filtering the frequency area signal by using the masking threshold;

a fifth function of converting the signal filtered in said fourth function into a time area signal;

a sixth function of generating an error correction code having copyright information and an error correction function, and providing a code to the time area signal according to the error correction code; and a seventh function of adding and deducting the time area signal to/from the original signal according to the provided code, and producing a signal having an imbedding of a watermark.

* * * * *